United States Patent
Wood et al.

(10) Patent No.: US 9,888,055 B2
(45) Date of Patent: Feb. 6, 2018

(54) FIREWALL FOR A VIRTUAL NETWORK AND RELATED TECHNIQUES

(71) Applicant: Profitbricks GmbH, Berlin (DE)

(72) Inventors: Conrad N. Wood, Berlin (DE); Achim Weiss, Berlin (DE)

(73) Assignee: Profitbricks GmbH, Berlin (DE)

( * ) Notice: Subject to any disclaimer, the term of this patent is extended or adjusted under 35 U.S.C. 154(b) by 5 days.

(21) Appl. No.: 14/200,948

(22) Filed: Mar. 7, 2014

(65) Prior Publication Data

US 2014/0280911 A1    Sep. 18, 2014

Related U.S. Application Data

(60) Provisional application No. 61/801,391, filed on Mar. 15, 2013.

(51) Int. Cl.
| | |
|---|---|
| *H04L 12/801* | (2013.01) |
| *G06F 9/455* | (2006.01) |
| *H04L 29/08* | (2006.01) |
| *H04L 12/803* | (2013.01) |
| *H04L 12/931* | (2013.01) |

(52) U.S. Cl.
CPC .............. *H04L 67/02* (2013.01); *H04L 47/10* (2013.01); *H04L 47/125* (2013.01); *H04L 49/00* (2013.01); *H04L 67/1008* (2013.01)

(58) Field of Classification Search
USPC ....................................... 709/224, 221, 220
See application file for complete search history.

(56) References Cited

U.S. PATENT DOCUMENTS

| | | | |
|---|---|---|---|
| 6,363,421 B2 | 3/2002 | Barker et al. | |
| 7,886,351 B2* | 2/2011 | Dadhia | H04L 63/02 726/11 |
| 8,146,147 B2 | 3/2012 | Litvin et al. | |
| 8,479,266 B1* | 7/2013 | Delker | H04L 63/0272 709/221 |
| 8,484,355 B1 | 7/2013 | Lochhead et al. | |
| 8,612,744 B2* | 12/2013 | Shieh | H04L 63/0218 713/153 |

(Continued)

FOREIGN PATENT DOCUMENTS

| | | |
|---|---|---|
| EP | 2 413 549 A1 | 2/2010 |
| EP | 2 482 496 A1 | 8/2012 |

OTHER PUBLICATIONS

Office Action dated Jul. 2, 2015; for U.S. Appl. No. 13/835,013; 16 pages.

(Continued)

*Primary Examiner* — Jude Jean Gilles
(74) *Attorney, Agent, or Firm* — Daly, Crowley, Mofford & Durkee, LLP (57) ABSTRACT

A system for filtering traffic in virtual networks includes a first virtual machine executed by a first physical server connected to a physical network and a second virtual machine executed by a second physical server connected to the physical network. The first and second virtual machines are connected to a same virtual network. A first firewall module is executed by the first physical server and a second firewall module is executed by the second physical server. The firewall modules are configured to filter network traffic received by the physical servers and addressed to the virtual servers.

15 Claims, 9 Drawing Sheets

(56) References Cited

U.S. PATENT DOCUMENTS

| | | | |
|---|---|---|---|
| 8,661,434 B1* | 2/2014 | Liang | G06F 9/45558 709/220 |
| 9,154,327 B1 | 10/2015 | Marino et al. | |
| 2002/0122394 A1 | 9/2002 | Whitmore et al. | |
| 2005/0066225 A1 | 3/2005 | Rowan et al. | |
| 2005/0076264 A1 | 4/2005 | Rowan et al. | |
| 2005/0120160 A1 | 6/2005 | Plouffe et al. | |
| 2006/0047923 A1 | 3/2006 | Kodama | |
| 2006/0047998 A1 | 3/2006 | Darcy | |
| 2006/0101221 A1 | 5/2006 | Harada | |
| 2006/0155708 A1 | 7/2006 | Brown et al. | |
| 2007/0028244 A1 | 2/2007 | Landis et al. | |
| 2009/0112919 A1 | 4/2009 | De Spiegeleer | |
| 2010/0070731 A1 | 3/2010 | Mizuno et al. | |
| 2011/0066823 A1 | 3/2011 | Ando et al. | |
| 2011/0271010 A1 | 11/2011 | Kenchammana et al. | |
| 2012/0030404 A1 | 2/2012 | Yamamoto et al. | |
| 2012/0144014 A1 | 6/2012 | Natham et al. | |
| 2012/0207174 A1 | 8/2012 | Shieh | |
| 2013/0019018 A1 | 1/2013 | Rice | |
| 2013/0136126 A1 | 5/2013 | Wang et al. | |
| 2013/0205384 A1* | 8/2013 | DeBaille | H04B 7/18508 726/13 |
| 2013/0263120 A1 | 10/2013 | Patil et al. | |
| 2013/0263125 A1* | 10/2013 | Shamsee | G06F 9/45558 718/1 |
| 2014/0101657 A1 | 4/2014 | Bacher et al. | |
| 2014/0108655 A1 | 4/2014 | Kumar et al. | |
| 2014/0280911 A1* | 9/2014 | Wood | H04L 67/02 709/224 |
| 2014/0359245 A1 | 12/2014 | Jones et al. | |
| 2015/0254007 A1 | 9/2015 | Wood et al. | |
| 2016/0112258 A1 | 4/2016 | Zhou et al. | |

OTHER PUBLICATIONS

Office Action dated Oct. 23, 2015; For U.S. Appl. No. 14/200,751; 17 pages.
Response dated Nov. 2, 2015 to Office Action dated Jul. 2, 2015; For U.S. Appl. No. 13/835,013; 13 pages.
PCT Search Report and Written Opinion of the ISA dated Sep. 9, 2014; for PCT Pat. App. No. PCT/US2014/027112; 14 pages.
Invitation to Pay Additional Fees for PCT/2014/027112 dated Jul. 3, 2014.
U.S. Appl. No. 13/835,013, filed Mar. 15, 2013, Weiss et al.
U.S. Appl. No. 14/200,784, filed Mar. 7, 2014, Wood et al.
U.S. Appl. No. 14/200,751, filed Mar. 7, 2014, Wood et al.
U.S. Appl. No. 14/200,764, filed Mar. 7, 2014, Wood et al.
U.S. Appl. No. 14/200,935, filed Mar. 7, 2014, Wood et al.
Notice of Allowance dated Oct. 2, 2015; for U.S. Appl. No. 14/200,935; 13 pages.
Non-Final Office Action dated Oct. 7, 2015; for U.S. Appl. No. 14/200,764; 16 pages.
Non-Final Office Action dated Jul. 28, 2016; for U.S. Appl. No. 13/835,013; 35 pages.
Non-Final Office Action dated May 4, 2016; for U.S. Appl. No. 14/200,784; 21 pages.
U.S. Appl. No. 15/479,470, filed May 9, 2016, Wood et al.
Notice of Allowance dated May 25, 2016; for U.S. Appl. No. 14/200,751, 10 pages.
Response filed on Jun. 22, 2016 to FInal Office Action dated Feb. 9, 2016; for U.S. Appl. No. 13/835,013, 19 pages.
Non-Final Office Action dated Aug. 25, 2016; for U.S. Appl. No. 15/149,470; 18 pages.
Applicant-Initiated Interview Summary dated Sep. 21, 2016; for U.S. Appl. No. 14/200,784; 3 pages.
Response filed on Oct. 3, 2016 to Non-Final Office Action dated May 4, 2016 for U.S. Appl. No. 14/200,784; 16 pages.
Notice of Allowance dated Feb. 26, 2016; for U.S. Appl. No. 14/200,764; 11 pages.
Amendment filed on Feb. 23, 2016 to the Non-Final Office Action dated Oct. 23, 2015; for U.S. Appl. No. 14/200,751; 21 pages.
"SolarWinds Network Management Guide", Cisco System, Dec. 2010; 20 pages.
Final Office Action dated Feb. 9, 2016; for U.S. Appl. No. 13/835,013; 32 pages.
Response filed Feb. 7, 2016 to Non-Final Office Action dated Oct. 7, 2015; for U.S. Appl. No. 14/200,764; 12 pages.
U.S. Final Office Action dated Jan. 11, 2017 for U.S. Appl. No. 14/200,784; 27 Pages.
Response to U.S. Non-Final Office Action dated Aug. 25, 2016 for U.S. Appl. No. 15/149,470; Response filed on Jan. 20, 2017; 9 Pages.
Applicant-Initiated Interview Summary dated Jan. 20, 2017 for U.S. Appl. No. 15/149,470; 3 Pages.
U.S. Final Office Action dated Mar. 30, 2017 for U.S. Appl. No. 15/149,470; 12 Pages.
Response to U.S. Final Office Action dated Mar. 30, 2017 for U.S. Appl. No. 15/149,470; Response filed on Apr. 5, 2017; 3 Pages.
Response to U.S. Final Office Action dated Jan. 11, 2017 for U.S. Appl. No. 14/200,784; Response filed on Apr. 11, 2017; 12 Pages.
Applicant-Initiated Interview Summary dated Feb. 7, 2017 for U.S. Appl. No. 13/835,013; 3 Pages.
Interview Summary dated Mar. 21, 2017 for U.S. Appl. No. 14/200,784; 3 Pages.
U.S. Advisory Action dated Apr. 28, 2017 for U.S. Appl. No. 14/200,784; 3 Pages.
Response with RCE to U.S. Final Office Action dated Jan. 11, 2017 for U.S. Appl. No. 14/200,784; Response filed on May 11, 2017; 18 Pages.
Notice of Allowance dated May 12, 2017 for U.S. Appl. No. 15/149,470; 11 Pages.
U.S. Non-Final Office Action dated Aug. 11, 2017 for U.S. Appl. No. 14/200,784; 20 Pages.

* cited by examiner

FIREWALL FOR A VIRTUAL NETWORK AND RELATED TECHNIQUES

CROSS REFERENCE TO RELATED APPLICATIONS

This application claims priority to and benefit of U.S. Provisional Patent Application No. 61/801,391 (filed Mar. 15, 2013), which is incorporated here by reference in its entirety.

FIELD

The concepts described herein relate generally to data centers and more particularly to virtual data centers.

BACKGROUND

As is known in the art, a data center is a facility used to house computer systems and associated components, such as telecommunications and storage systems. It generally includes redundant or backup power supplies, redundant data communications connections, redundant storage devices, environmental controls (e.g., air conditioning, fire suppression) and security devices.

SUMMARY

A system for filtering traffic in virtual networks includes a first virtual machine executed by a first physical server connected to a physical network and a second virtual machine executed by a second physical server connected to the physical network. The first and second virtual machines are connected to a same virtual network. A first firewall module is executed by the first physical server and a second firewall module is executed by the second physical server. The firewall modules are configured to filter network traffic received by the physical servers and addressed to the virtual servers.

BRIEF DESCRIPTION OF THE DRAWINGS

The foregoing features of this invention, as well as the invention itself, may be more fully understood from the following description of the drawings in which.

DETAILED DESCRIPTION

Figure 1:
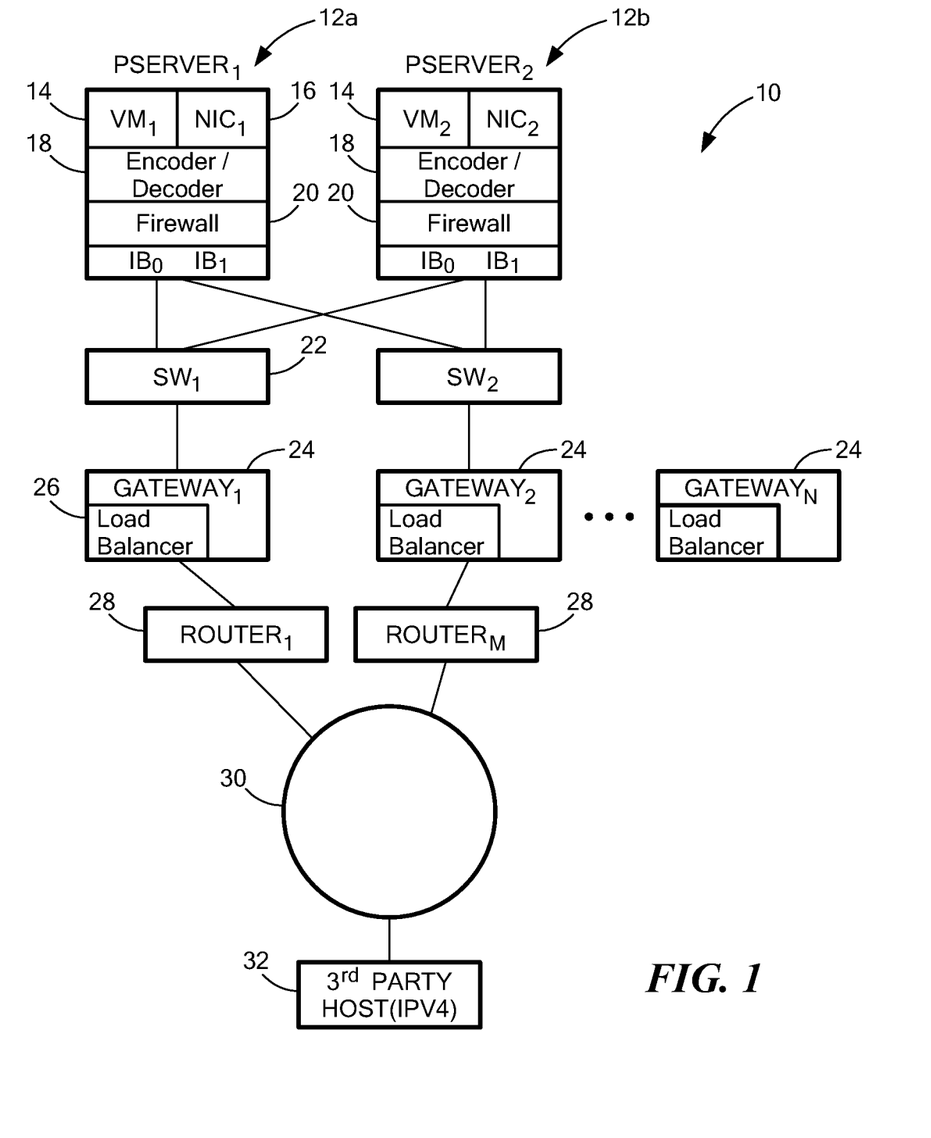
FIG. 1 is a block diagram which illustrates the flow of a packet from a virtual machine residing on physical server to a third party.

Referring now to FIG. 1, a network 10 (illustrated in the form of a network diagram) includes one or more physical servers each of which supports one or more virtual machines (where, as is know in the art, a virtual machine is a computer software application in which when executed on a physical server, simulates a physical computer). Thus, as noted physical servers 12a and 12b may each execute one or more virtual machines (e.g. virtual machine 14). As will be described in further detail below, each physical server may also execute one or more encoder/decoder modules, and one or more firewalls. The physical servers also have network interfaces including one or more network cards designated IB0 and IB1 in FIG. 1.

Each physical server may be connected via a network to one or more network switches 22. These network switches may be connected, via a network, to one or more gateways 24. The gateways 24 may in turn be connected via a network to one or more routers 28. The routers 28 may provide access to (e.g. be connected to) a wide area network 30, which may be an internet or a private wide area network. Third party computers 32 may communicate with the virtual machines 14 through the network infrastructure shown in FIG. 1.

The network infrastructure may include one or more load balancer modules (or more simply, "load balancers") 26. These load balancers may be resident on and/or executed by the gateway machines. When network traffic arrives for a virtual machines, the load balancer may intercept the traffic and determine which virtual machine the traffic should be sent to. In an embodiment, the load balancer will choose the virtual machine having the least processing load that is capable of handling the traffic.

Since load balancers interact with multiple virtual machines, the load balancers may be resident upon gateway machines within the network infrastructure.

When a packet is received by the load balancer, the load balancer may partially decode the packet to determine whether the packet is being directed to a virtual machine that is being load balanced, and whether the destination virtual machine is a short cut to an arc or node that is being load balanced. If so, the load balancer then determines which node the packet is being sent to. Once this is determined, the load balancer can direct the packet to an appropriate node according to a load balancing scheme including but not limited to a round robin scheme, lowest load first, fastest throughput scheme, and the like.

The load balancer monitors the virtual machines in order to determine their current load. The virtual machines may include software that provides various measurements of performance and load. The load balancer can access these measurements to help in determining whether to send packets to the virtual machine. For example, the load balancer may receive measurements such as network traffic load, processor utilization, hard drive utilization, memory utilization, etc. If a virtual machine has a heavy load, the load balancing algorithm may indicate that the virtual machine is not a good candidate to receive more traffic.

The load balancer can also track and retain information about where packets are delivered. For example, if a third party user opens a connection to a load balanced virtual machine, the load balancer can retain information about that connection so that future network packets of the connection are always sent to the same virtual machine instead of being load balanced to other machines. This can eliminate the need for the user to re-authenticate on a different virtual machine if the load balancer changes the destination of the network traffic. For example, if a virtual machine is hosting a website that requires authentication, the connection to the website can remain with a single virtual machine because changing the destination of the packets could require the user to re-authenticate with the website.

The load balancer can also determine if a virtual machine is responding to network traffic. If the load balancer sends traffic to a virtual machine, and the virtual machine does not respond within a predetermined time period, the virtual machine may be removed from the load balancer's list of machines that it can send network traffic to.

In an embodiment, load balancing information is assigned through software. In other words, each gateway may make the same routing decision based upon source and destination IP addresses and ports. Preferably, this technique eliminates the need to synchronize the gateways on which the load balancers are executed. For example, the physical servers send updates about the virtual machines and their processing loads to the load balancers, but there may be no need to synchronize in the other direction and send information from the gateway to the physical server.

It should be understood that in accordance with the concepts, systems and techniques described herein, a physical server bank (i.e. a group of servers) may be divided into a number virtual machines (e.g. including virtual servers). Thus, a plurality of virtual machines may reside on a single physical server. Physical server banks provide physical resources that can be allocated to computing infrastructures. Further, the physical server bank may be divided into a number of virtual machines, where each virtual machine uses a portion of the physical server resources. In some applications, a single virtual machine may utilize one or more cores of the physical server while in other applications a single virtual machine may utilize a portion of a physical server core (e.g. two or more virtual machines may utilize a single core). Conversely, in other embodiments, a single physical server may be divided into multiple virtual machines in a similar manner.

Referring still to FIG. 1, the logical diagram network depicts the arrangement of system infrastructure and can be used to help explain how virtual traffic is routed.

The exemplary network of FIG. 1 includes two physical servers 12a, 12b and also designated as PERSERVER1 and PERSERVER 2 in FIG. 1 on which are executing application software to implement virtual machines. Each Pserver has two interfaces, IB0 and IB1, each of which is connected to corresponding ones of a pair of switches SW1, SW2 (i.e. each interface is connected to one a distinct switch). In one embodiment, the system comprises only two switches with each switch having 48 ports. Thus, a relatively large number of physical servers may be coupled to each switch. Each switch connects to at least one internet gateway and each internet gateway connects to at least one distinct switch on one of the routers. Thus, given the full path any one wire can fail, any one switch can fail and one any internet gateway can fail, and anyone internet call router can fail, but the system still has full connectivity. It is significant to note that by providing the system having two switches, any one switch can fail and the system remains operational (i.e. the system has redundant paths and a fail over capability). Of course, the network of FIG. 1 is shown for exemplary purposes only. Other network infrastructures and topologies can be used as well.

Thus, infrastructure having redundant wiring and redundant cabling is provided and which can be used if the system is required to operate in a failover mode as described further herein (see "Flow: Pserver to Pserver fail over").

Figure 1A:
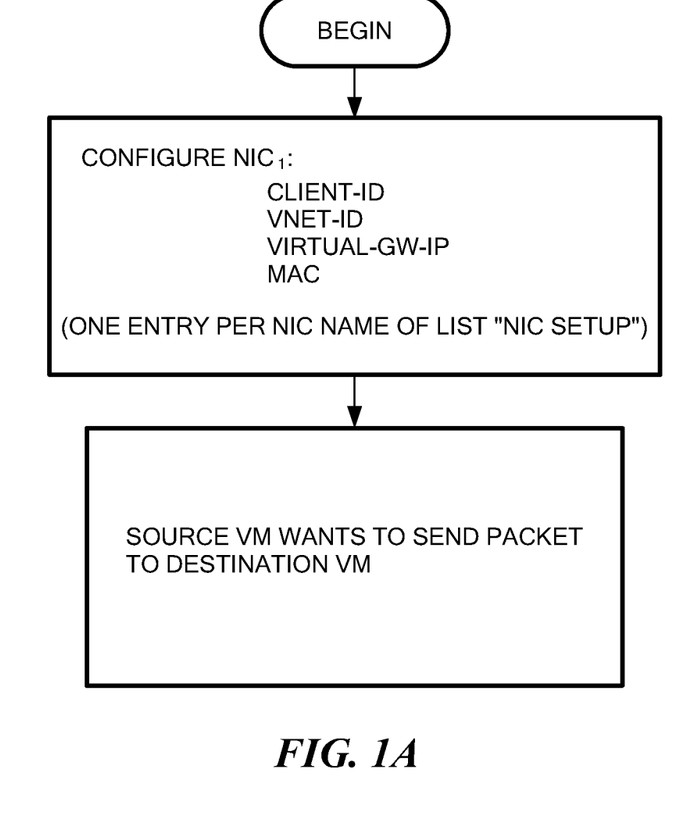
FIG. 1A is a diagram which illustrates the flow of Pserver to Pserver failover.

Referring now to the Table below and to FIG. 1A, in view of the encoding and decoding described herein and in view of the redundancy described herein (e.g. two physical connections or wires coupled from one physical server to the other physical server), in the event that a physical server varies in-whole or in-part, the encoder decides which network path to use for communication, e.g. whether to send network communications to SW1 or SW2, to provide a communication path or another physical server. To make this decision, the system utilizes sessions. As used herein, the term "session" refers to a connection between two virtual network interface cares (NiCs) on different physical servers via the same fabric/network and a "session device" refers to a device associated with a session (one device is attached exactly to one fabric).

When the system sends traffic between two virtual machines (VMs), the system first checks to see whether traffic has been sent between the two VMs in the past. If the system has sent traffic between two VMs, then a session exists. If the system has not yet sent traffic between the two VMs, then the system decides that there is no pre-existing session. If there is no session, then the system creates a new session. At the beginning, the session on both wires is unresolved because the system does not yet have information about the state of the session.

Consider the following Table:

TABLE

| Session 1 | Session 2 | Behavior |
|---|---|---|
| Ok | Ok | Use last recent session |
| Ok | Fail* | Use non-failed session |
| Unresolved* | Unresolved* | Use both paths to send packet (track packet 10 on dest. To avoid dups(?) |
| Fail* | Fail* | Drop |
| Ok | Unresolved* | Use Ok session |
| Fail* | Unresolved* | Use Unresolved session |

For the entries marked with an asterisk (*), the system may continue to check these sessions in the background to determine if communication can be established.

Looking at the Table, certain entries list session 1, session2, or both as unresolved. In cases where both sessions on both wires are unresolved, the system uses both paths to send the same packet. The system adds a sequence number to this packet because the system has the option that either one wire works or the other wire works or both wires work. The system detects whether both packets arrive twice by checking the sequence number and discards one copy so that a client only receives one packet and not two packets, in order to avoid duplicate packets).

If is found that the system is able to send the packets on a session then the system moves the session from the state of "unresolved" to the state of "OK." The system has the option to utilize any combination of states e.g.: both have failed; both are OK; or one failed and one is OK.

If a packet is sent between two physical servers (Perservers), in the case where both sessions are okay (as indicated in the first row of the Table), the system simply uses the most recent session (e.g. if the last time wire one was used for the traffic, then wire one is simply used again).

In the case where one of the wires is not available (as indicated in the second row of the Table) system can use the session that is "OK" (as indicated in the first row of the table) and continue sending traffic along the path.

If a session is indicated as having a status of "Fail" or "Unresolved," the system performs background checks by continuously or periodically trying to determine whether the session is now working again. Thus, the system allows changing a session state at any time and dynamically changes depending upon the actual state of physical wiring (i.e. whether a physical correction can be made). Thus, if the wiring begins to fail the state changes to Fail, if the wiring begins to operate properly the state changes to "OK".

If a session is marked as "Unresolved", this indicates that a packet has not yet been successfully transmitted and/or received over the session. Thus, in the case where one session is OK and the other "Unresolved", the OK session is used since it is known to work.

In cases in which the session states are Fail and Unresolved, the system may choose to test the Unresolved session and not the failed session, because the state of the failed session is already known. Although it is unknown whether the session will work via unresolved, the reason for the unresolved state is simply that the system does not have any information. Once the packet is sent, the system learns the response of that packet (i.e. either that the session goes into a state of Fail or a state of OK). If the packet is sent into an unresolved session, the system will subsequently determine if the session is OK or failed.

From a client (or customer) perspective, the customer has an Ethernet network. The customer need not take any steps to make the network redundant, and need not use complicated bonding devices, routing algorithms, the system does all of that for the client designed in the virtual Ethernet.

The session information may be kept in the software stack that checks the sessions.

It should be noted that the technique described herein provides the customer within redundant network paths without requiring the virtual machine and the operating system of the customer to be configured in a certain way to make use of this redundancy.

Thus, by implementing the redundancy table in the software stack, the system is able to provide a redundancy characteristic without any special requirements on the virtual machine for the third party (i.e. the client need not configure anything on the client). In accordance with the concepts and techniques described herein, such redundancy is required in a way which is transparent to the client. That is, any client can set up a virtual machine with the network and has redundancy automatically built in.

FIGS. 2, 2A, 3, 3A, 5 and 6 are a series of flow diagrams showing the processing performed by a processing apparatus which may, for example, be provided as part of a network such as that shown in FIG. 1. The rectangular elements (e.g. block 40 in FIG. 2) in the flow diagram(s) are herein denoted "processing blocks" and represent steps or instructions or groups of instructions. Some of the processing blocks can represent an empirical procedure or a database operation or process while others can represent computer software instructions or groups of instructions. The diamond shaped elements in the flow diagrams (e.g. block 52 in FIG. 2A) are herein denoted "decision blocks" and represent steps or instructions or groups of instructions which affect the processing of the processing blocks. Thus, some of the processes described in the flow diagram may be implemented via computer software while others may be implemented in a different manner e.g. via an empirical procedure.

Alternatively, some of the processing and decision blocks can represent processes performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to perform the processes or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of processes described is illustrative only and can be varied without departing from the spirit of the invention.

Figure 2:
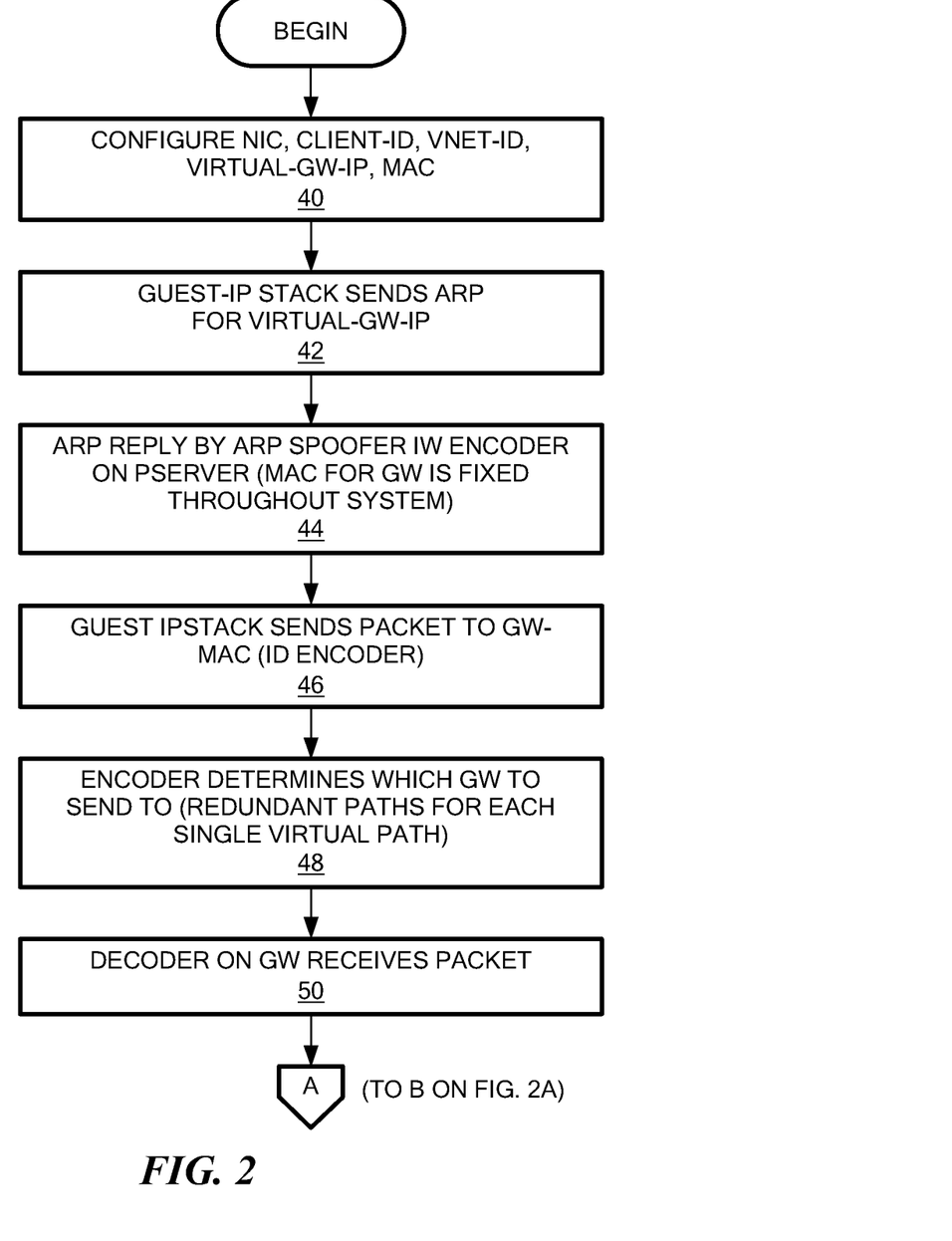
FIGS. 2 and 2A are flow diagrams which illustrates a process of sending a packet from a virtual machine residing on a physical server of a data center to a third party.
Figure 2A:
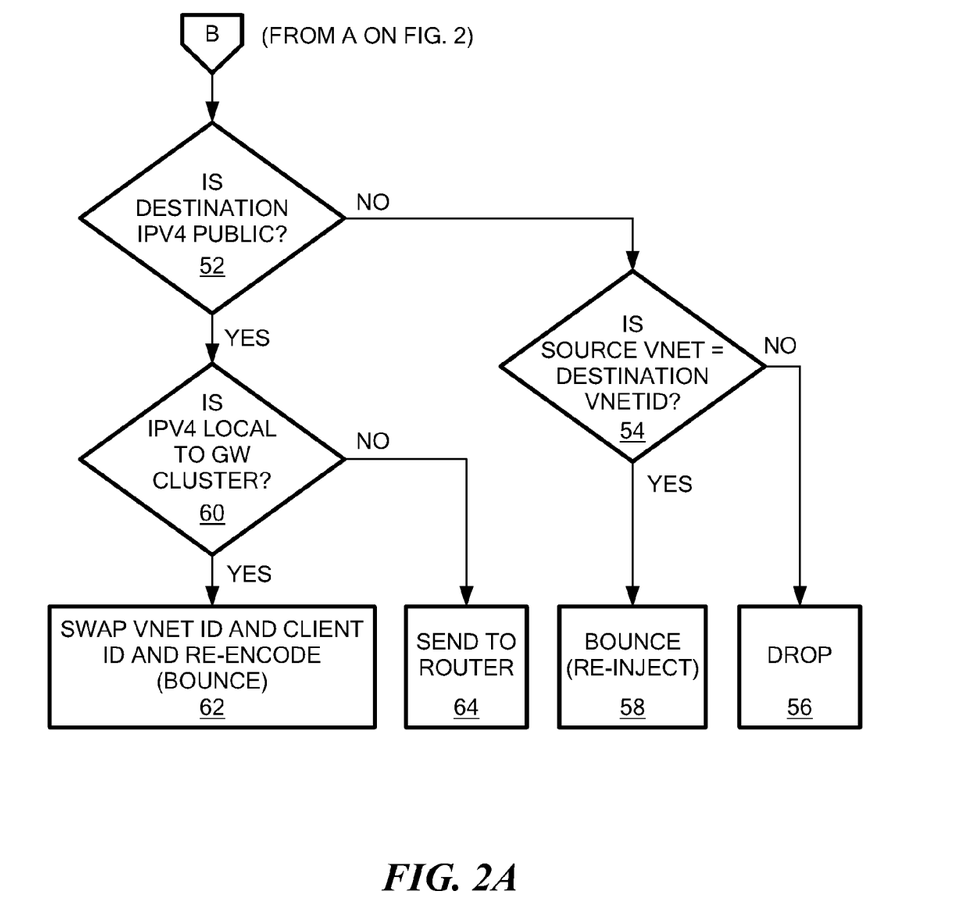

Turning now to FIGS. 2 and 2A, a process is shown for sending a packet from a virtual machine ("VM") to a third party server. When a client orders a virtual machine, the client may add a network card to the VM and, for each network card associated with that virtual machine, the system sends from its database (stack) the information to the physical server (Pserver) to start a VM with a given network card, MAC, a virtual network identifier (ID) (VNET ID), a clientID, and a virtual gateway client ID.

The client id, the VNET ID and the MAC are described herein; the virtual gateway ip is an internet protocol (IP) address to which the network reacts or responds in a special way. If the virtual machine sends an IP packet to the IP address of the virtual gateway, then it is intercepted and routed via a virtual gateway ip.

It should be appreciated that this virtual gateway ip corresponds to the systems of an entire cluster of gateways. Typically, a system would have a default router and a default IP address. The system described herein, however, has a cluster and a fully redundant system with many paths and thus the gateway cluster has a relatively large number of IP addresses (e.g. about sixteen 16 different IP addresses in one embodiment) under which they can be reached. Thus, the system intercepts the traffic and sends a response to the virtual machine (e.g. an ARP reply response) to say it is a special MAC address that has been fixed throughout the systems (always the same one) which is entered by a network frame to be routed to the gateway.

It should be appreciated that the elements described above work in conjunction with each other. As an initial matter, the virtual machine may send a packet out onto the internet. Thus, when the VM determines that a router is needed (the normal standard routing mechanism), it sends an ARP request for the IP address of its default router. The system recognizes that ARP request because the system has information about the virtual gateway IP address and the system intercepts that packet sends back an ARP reply where the system puts a special MAC address into the MAC frame (i.e. if it is desired to get to the default router, it is necessary to use this MAC address in the internet frame).

The virtual machine does so with its standard IP stack and sends out the internet frame with the thus provided MAC address and the system, at that point, uses the redundancy mechanism to determine where to route the packet. Thus, the mechanisms described between the physical servers (Pservers) also works between gateways (e.g. routed between IB0 or IB1 and the system sends the packet to any one of the gateways). Thus, if any one gateway fails, it does not cause the system to fail since the system includes a plurality of gateways any of which can be used. Thus, the purpose of the described technique is to allow the use of redundant gateways.

Significantly, as noted above, the system includes redundant gateways and redundant internet connections. Thus, if one of the gateways or the internet connections fail, the system utilizes the redundancy stack.

The number of gateways are selected based in large part upon the load placed upon the gateways. If the system recognizes that the gateways are busy, then another gateways is added.

As noted above, each physical server can have more than one virtual machine executing thereon. In one embodiment, the physical servers are limited to 62 virtual machines (i.e. 62 VMs per Pserver) with capacity to go up to several hundred. In one embodiment, a Pserver having 64 CPU cores will host 62 VMs. Thus, if available state of the art Pservers are limited to 64 cores, then the limit is set at 62 with 2 being reserved for the system. Thus, if servers having 128 cores become available, then the limit could be set at 126 with 2 being reserved for the system and so on an so forth. The cores that are held in reserve can be used, for example, to perform maintenance and management tasks on the Pserver. In various embodiments, more or less than 2 cores can be reserved to perform these tasks.

Alternatively, by eliminating a client guarantee of 1 CPU core (i.e. offering clients virtual machines that do not have a guarantee of 1 CPU core) then the number of VMs per Pserver can be increased. This can reduce hardware cost because the system can place many VMs (e.g. hundreds of VMs onto a single Pserver) which makes operation of the system less expensive. Alternatively, some computed metric can be established to set the number of VMs on a single Pserver, or slices of a core can be assigned to each client which again can establish the number of VMs on a Pserver.

In terms of the routing, when a virtual machine communicates with another virtual machine on the same physical server, little or no network traffic is required since the encoder and decoder are both present on each physical server. The packet sent out via a VM on a physical server will arrive at the decoder of the same physical server and will be treated just as if it were a packet coming from the outside the physical server. Thus, the packet need not go out on the physical server's network interface card ("NiC") and onto the physical network, rather, it may simply move straight from the encoder to the decoder and not utilize any network bandwidth. To accomplish this, the system maps the memory area of the one virtual machine with the data to be sent to the other one into the memory area of the second virtual machine and notifies the second VM that it received data. This results in a very fast switching mechanism and system.

It should be appreciated that the network is dynamic and virtual machines may be moved from Pserver to Pserver relatively frequently. In one exemplary embodiment, the virtual machines reside on a Pserver for periods of time (e.g. hours or days, or weeks or months), then move to the next Pserver. This is done to continuously optimize the network and cut down on resources which are not being used or which cannot be used. For this reason, the full speed of the switching mechanism may not be made fully available to a client. If the full speed of this switching mechanism to were provided to a client, then they may observe a varying speed because, in such an embodiment, sometimes the VM must communicate with the same machine and sometimes the VM must communicate over the network. By limiting it all to the same speed and not using the associated MAC for speed in that aspect, it is still helpful for the system because it does not use any CPU cycles and does not result in network traffic. Thus, it makes the system more efficient and less expensive. For example, in various embodiments, the traffic is moved from one virtual machine to another using CPU-Cycles assigned to the Virtual machine(s) related to the move of data. Thus there may be a natural limit (the speed and number of cpu cycles/cores) which limits the speed of the traffic.

In certain instances, when memory is being mapped, the Pserver may introduce a delay between the time the memory is mapped and the time the recipient can access the mapped data. For example, the mapping operation may require only a single instruction to be executed by the CPU in order to map the entire set of data being communicated to the recipient. Because the mapping operation happens quickly, the recipient machine may not be ready to receive the data. Thus, adding a delay can reduce errors relating to the mapping of the data.

The manner in which a Pserver sends a packet to the gateway is next described. When a packet arrives at the gateway, information corresponding to the client id, the virtual network id, the MAC address, etc. is all included in the packet header. Additionally, whether the protocol is IP is known. In this case, if a packet arrives at the gateway and it is not IP, then it is dropped. In one embodiment, the gateway is configured to only communicate via IP to the outside world, i.e. the system may be configured to not support IPX or IPN routing to the outside. In other embodiments, the gateway may be configured to support IPX or IPN routing to the outside.

If the packet received by the gateway is an IP packet, then it is determined whether the destination IPv4 is a public IPv4. If it is not a public IPv4 address, then the system may determine that it is a virtual machine (VM) on a local LAN that is sending the packet to the gateway. In this case, the packet is taken and re-injected (i.e. forwarded by the gateway) into the LAN. This is done provided the virtual network ID (VNET ID) matches the network ID which sent the packet. Thus, even if the gateway is used, it may prevent packets from crossing borders between virtual networks. Thus, the system can prevent one client from injecting traffic into or receiving traffic from another client's network. In such cases, the packet may be either bounced and re-injected or dropped.

If the IPv4 is public, the system determines whether the IP address that the virtual machine sends is an address that is connected to the same network cluster as the system, or whether it is connected to an external network, such as the internet.

In some cases, a client may wish to browse the website from another client hosted by the same data center. In this case, the system may allow network traffic to flow from one client to another client (i.e. if a client has a website that is publically accessible, the server can be accessible from other client within the data center).

If the IPv4 is local, then the system changes the virtual network ID or client ID to one of the VM IDs in the network cluster and sends it back onto the network. If it is not local, then the packet is sent to the core routers and the packet is routed through the internet.

It should also be appreciated that the entire system is redundant and that the system can simulate (from the virtual machine) a single gateway at least in part because the gateway clusters are addressable with a single address.

In such an embodiment, the system may not require knowledge that a large number of gateways exist. The virtual machine is configured relatively simply and the standard configuration of a VM with a default router will lead to access to a number of different gateways and routing traffic throughout the network to simulate a router as much as possible, but in a redundant and performance enhancing way.

It should also be appreciated that the entire system can be scaled to provide increased or decreased performance (e.g. increased or decreased network bandwidth) such that, if desired, it is never necessary to have a bottleneck. This occurs due to the ability to add gateways, Pservers and other resources.

It should also be appreciated that during ARP processing, the system assigns the same virtual IP addresses and virtual MAC addresses to physical gateways. This is significant because many clients may have different IP addresses (e.g. clients having a private network address of 10.1.1.1. or 172.21.1). Thus, in the network of the system described herein, the same IP address can be used for multiple network devices attached to different virtual networks. For example, multiple devices can have the IP address 10.1.1.1 if so desired. The system described herein allows a client to use their preferred IP addresses or network, and the system provides the client with an IP address of a gateway corresponding to the chosen subnet. For example, if a client wishes to use the subnet 10.1.1.xxx, the system may provide a virtual gateway with an IP address of 10.1.1.254 (or any other address within the subnet 10.1.1.xxxx). Thus, clients are free to use whatever subnets or IP address ranges they desire.

Turning now to FIGS. 2 and 2A, processing or flow which takes place when a packet is sent from a virtual machine (e.g. VM1 in FIG. 1) to a third party host (e.g. third party host 32 in FIG. 1) first begins in processing block 40 in which a configuration process is performed. During configuration, network interface cards (NiCs), client identifiers (IDSs), virtual-gateway-internet-protocol addresses and media access can ( ) addresses are established and configured. Processing then flows to processing block 42 in which a guest-IP stack sends an address resolution protocol (ARP) multicast for a virtual gateway IP.

In processing block 44 an ARP reply by an ARP spoofer in an encoder is provided on a physical server (Pserver). Next the Guest-IP stack sends a packet to a gateway MAC (to be encoded).

Processing then flows to processing block 48 in which the encoder determines the gateway to which it should send packets. It should be noted that in preferred embodiments, redundant, physical paths exist for each single virtual path. Processing then flows to processing block 50, in which the decoder on the gateway receives the packet.

Processing then proceeds to decision block 52 in which a determination is made as to whether the destination is IPV4 public. If it is determined that the destination is not public, then processing flows to decision block 54 where a decision is made as to whether a source VNET ID is equal to a destination VNET ID. If it is determined that the two values are not equal then the packet is dropped. If it is determined that the values are equal then the packet is re-injected into the network traffic.

If in decision block 52 a decision is made that the destination is public, then processing flows to decision block 60 in which it is determined whether the IPV4 address is local to the gateway cluster. If a decision is made that the address is not local to the gateway cluster then processing flows to processing block 64 and the packet is sent to a router. If, on the other hand, a decision is made that the packet is local to the gateway cluster then processing proceeds to processing block 62 where the VNET ID and CLIENT ID are swapped and the packet is re-encoded.

Figure 3:
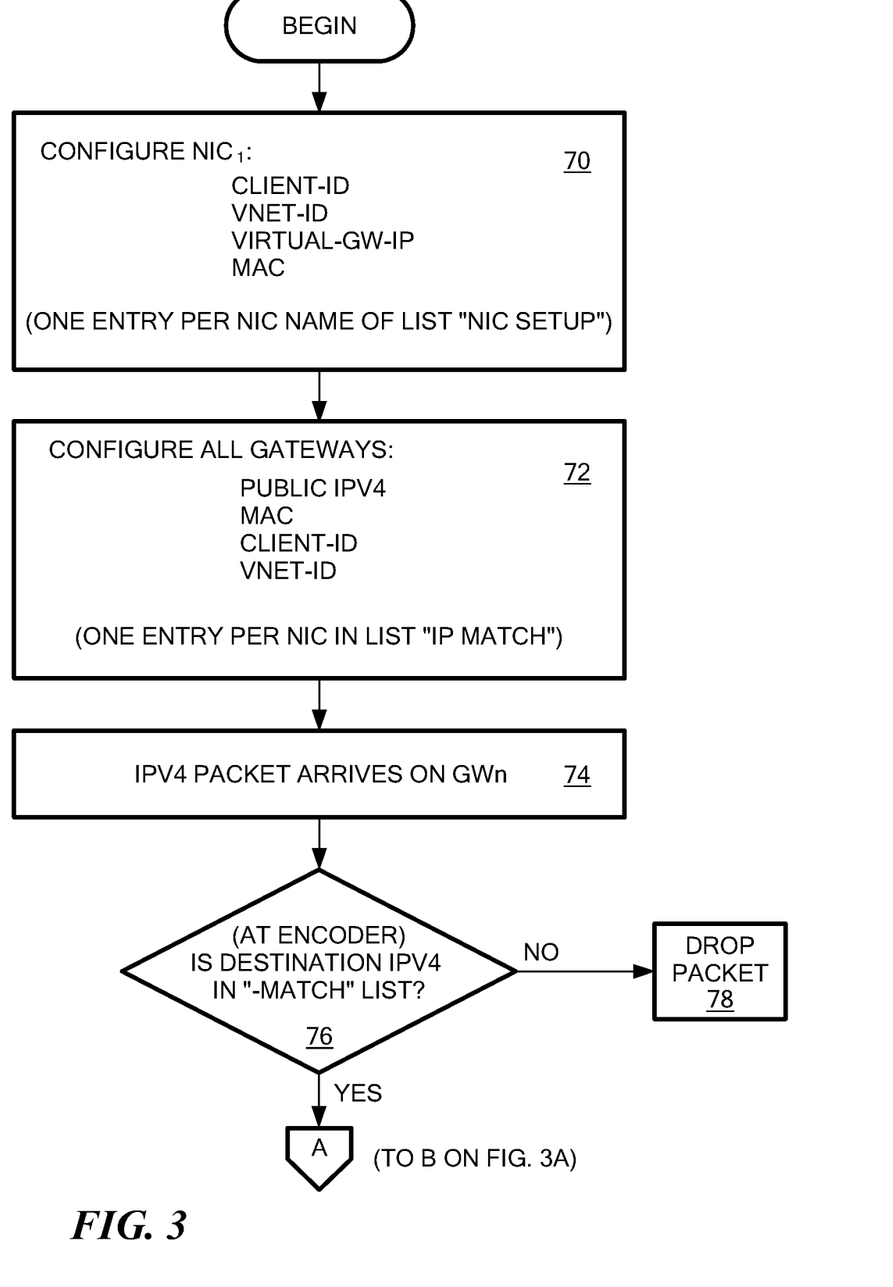
FIGS. 3 and 3A are flow diagrams which illustrates a process of sending a packet from a third party to a virtual machine residing on a physical server of a data center.
Figure 3A:
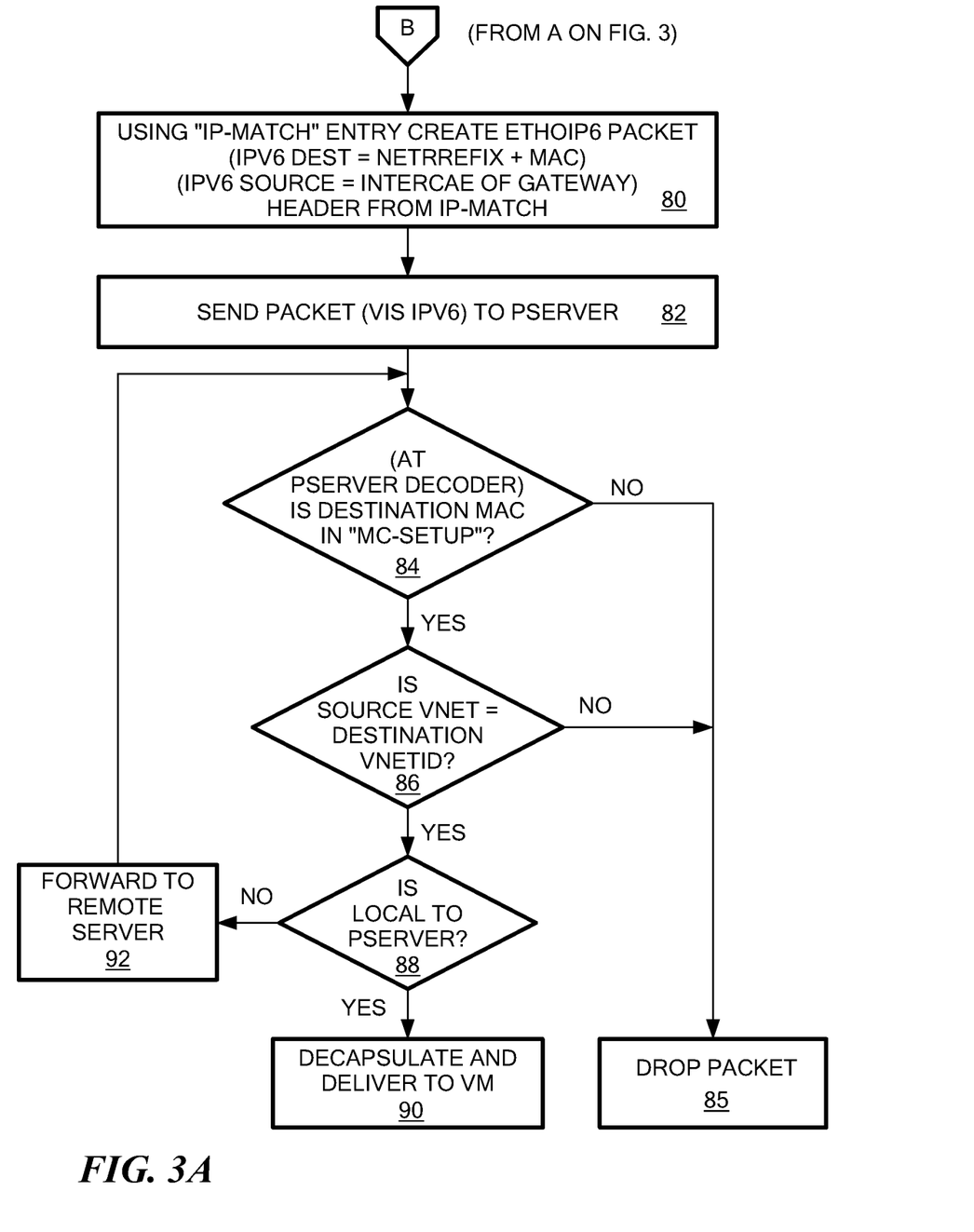

Referring now to FIGS. 3 and 3A, the flow of a packet from a third party server to a virtual machine (e.g. VM1 in FIG. 1) begins by configuring a NiC and all gateways as shown in processing blocks 70 and 72.

In processing block 74 a packet arrives at one of a plurality of gateways (e.g. gateway GWn) and then processing proceeds to decision block 76, in which a decision is made as to whether the IPV4 addresses exists in a match list. If the address does not exist in the match list, then the packet is dropped as shown in processing block 78.

If, on the other hand, there is a match, then processing proceeds to processing block 80 in which a packet is created and the packet is then sent to the appropriate physical server (PSERVER) as shown in processing block 82.

Processing then proceeds to decision block 84 where a decision is made as to whether the destination MAC address exists. A mac-address management tool, such as MC-Setup or a custom software tool, can be used to make the determination. If in decision block 84 a decision is made that the destination MAC address does not exist, then the packet is dropped as shown in processing block 85.

Otherwise, processing proceeds to decision block 86 in which a determination is made as to whether the source VNET ID is equal to the destination VNET ID. If the two values are not equal, then the packet is dropped as shown in processing block 85. If the values are equal, then processing proceeds to decision block 88 where a decision is made as to whether the address is local to physical server PSERVER. If a decision is made that the address is local, then processing proceeds to processing block 90 where the packet is decapsulated and delivered to the appropriate virtual machine. Otherwise, processing flows to processing block 92 where the packet is forwarded to a remote server and the processing begins again at decision block 84.

In the process of sending a packet from a third party server to a virtual machine, when a new VM is created, the system sends information to the Pserver. At this point, the system may send a packet from the internet to the virtual machine. It is noteworthy, to point out that the gateways are configured with the MAC address of the VMs with the public IPv4 address, the client ID and the V-Net ID. This is referred to as an IP Match Entry. The system has a list that is called IP-Match and these four numbers together are referred to as an IP Match Entry. The list is held in a table in kernel space on the gateway (e.g. in the NiC of the gateway) and is used to translate public IPv4 address into virtual machine addresses. The virtual machine addresses can include one or more of: IPv4 addresses, IPv6 addresses, customer IDs virtual machine IDs, PServer IDs, etc.

There are at least two ways these entries can be made. In one approach, the database connects directly to the gateways directly (i.e. the database communicates with the gateways and request that an IP Match Entry be added to the gateway). In another approach, referred as an auto-configuring approach, the gateways are configured from the Pserver. This is done since the information needed by the gateway is actually on the Pserver. Thus, when a Pserver starts a VM, the Pserver multicasts to the gateways the information it has and the gateways add this information to their IP Match and tables.

When the packet arrives on the gateway (e.g. the IPv4 packet arrives), the packet goes into the encoder and the system determines whether there is a match in the IP Match Table. If no match is found, the packet is dropped. It is assumed the IP Match Entry Table has a complete list of all IP addresses that run in the data center. Because of the cluster and zone environment approach used, a high degree of confidence exists in this assumption. The IP Match List is optimized to accommodate the large number of addresses (e.g. millions of IP addresses) and the system can simply match the addresses. For example, the IP Match List can be stored as a tree or other data structure to reduce the time required to search the IP Match List for an entry.

If the address matches one of the virtual machines in the data center, the system creates an ethoip6 packet, which uses the same mechanisms to create the IPv6 destination IP address from the net prefix and the MAC (the Net Prefix is an IPv6 identifier of the cluster and is added to the MAC). The MAC received the IP Match Entry so it has a complete IPv6 destination address to which to send the traffic. The IPv6 source address is the interface of the gateway from which it was received. Therefore, the system can distinguish whether the traffic came through one, two, three or N gateways. The system also adds the header with the remaining bit from the IP Match Entry.

When that is done, the IPv6 packet is transmitted to the physical server (PSERVER, in FIG. 1), at which point the same redundancy mechanism over two wires (described above) will be used. Therefore, the traffic will eventually arrive at a physical server destination and be processed in manner the same as or similar to that described above.

The system determines whether a destination MAC address belongs to the virtual machine and whether the source v-net id is the same as the destination v-net id. If so, the system checks to see whether the address is local to the Pserver. If a packet is received by the Pserver, the system determines whether there is an entry in the routing table on the Pserver. If so, the system can determine that the packet should be sent to one of the virtual machines, and forwards the packet to the virtual machine.

If it is determined that the packet is addressed to a virtual machine that does not reside (i.e. is not currently being executed by) the current Pserver, the Pserver forwards the packet to the proper Pserver, or re-inserts the packet into the network. As mentioned above, virtual machines may be moved from Pserver to Pserver. Thus, virtual machines move from Pserver to Pserver they can continue to receive network traffic.

Considering a scenario where a packet addressed to a particular virtual machine is received at the Pserver just after the virtual machine has been moved to a different Pserver, when the virtual machine was moved, an entry was made in the Pserver's table indicating which Pserver the virtual machine was moved to. When the first Pserver receives the packet, it determines that the virtual machine no longer resides on the first Pserver and forwards the packet to the Pserver listed in the table.

Virtual machines may move from Pserver to Pserver for a variety of reasons including, but not limited to: the inability to add more VMs to a Pserver; a Pserver not operating; a Pserver being overloaded, etc.

For another reason to move a VM from one Pserver, consider the scenario where 62 virtual machines are being executed by a Pserver. Now assume that a client requests a single 62 core virtual machine. The Pserver only has two free processor cores and cannot accommodate the request. Moving one or more VM form a core on one Pserver to a core on another Pserver can free up the Pserver so it can accommodate the request.

Furthermore, in some embodiments, it is possible to measure characteristics such as network traffic and I/O traffic and optimize to that as well. For example, if there are ten virtual machines that send each other a large amount of network traffic, it may be beneficial for them to reside on the same Pserver. Doing so can result in more efficient use of the hardware. For example, if the virtual machines reside on the same Pserver, the traffic between the virtual machines need not be inserted onto the physical network between Pservers.

Furthermore, if the client so desires, the client can request a VM to be moved to or from a particular Pserver. For example, the client may request that different VMs be executed by Pservers in different physical locations for security or reliability purposes.

Figure 4:
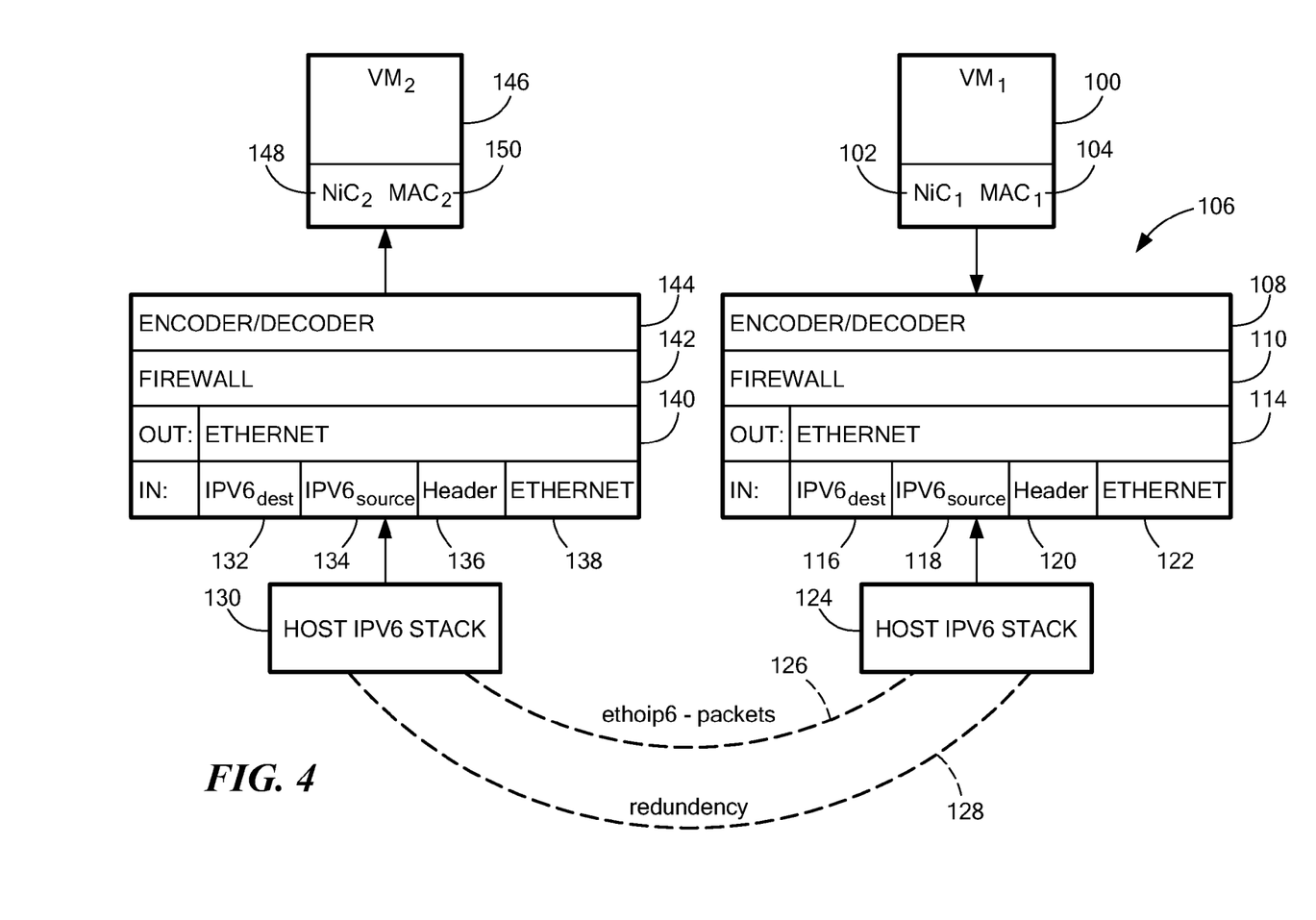
FIG. 4 is a block diagram of a communication network between a pair of virtual machines.

Referring now to FIG. 4, a diagram of a communication network between a virtual machine 100 and a virtual machine 146 is shown. Virtual machines 100 and 146 may be software applications stored in computer readable storage medium and executable by a processor. The virtual machines 100 and 146 may simulate computers, i.e. they may provide services similar to or the same as services provided by a desktop computer, a server, a laptop, a cell phone, a mobile device, etc.

In an embodiment, the services provided by virtual machines 100 and 146 may include communication services, an operating system, hardware simulation, data processing services, etc. Each virtual machine 100 and 146 may also include a virtual (i.e. software based) processor that can execute computer readable code and software.

As shown in FIG. 4, a first virtual machine 100 includes a virtual network interface card (NIC) 102 and may include a MAC address 104. Similarly, virtual machine 146 may include a NIC 148 and a MAC address 150. NIC 102 and 148 may be virtual (i.e. software based) NIC cards that are part of the virtual machines 100 and 146. The MAC addresses 104 and 150 may be stored in memory and may provide the virtual NIC cards 102 and 148 with unique MAC addresses.

Virtual machines 100 and 146 may be implemented by physical servers. Physical servers may comprise physical hardware, e.g. a server computer, a series of server computers, etc. In an embodiment, a physical server may have multiple computer processor chips (processors). A physical server may, for example, have 1, 2, 4, 8, 32, 64, or more physical processors. These processors, along with other hardware and software resident in the physical server, may execute code that implements the virtual machines. The physical servers may also include other processing resources such as Ethernet cards (e.g. Ethernet cards 138 and 122), memory, storage such as hard disk drives, etc.

Although FIG. 4 shows each physical server as having a single virtual machine, each physical server may implement more than one physical machine. In an embodiment, a physical server may implement a number of virtual machines up to the number of physical processors in the server. For example, if a physical server has 64 processors, it may implement up to 64 virtual machines, each virtual machine having a physical processor assigned to it. In an embodiment, a physical server having 64 processors may reserve some of the processors for other functions, such as executing software or an operating system required to run on the physical server. For example, a physical server may reserve 62 processors for executing virtual machines, and may reserve 2 processors for executing other software.

In some instances, the physical server may assign multiple processors to a virtual machine. A virtual machine that requires more processing power may, for example, have 2, 4, 8, or more processors assigned. In other embodiments, a single physical processor in the physical server may be assigned to more than one virtual machine. In an embodiment, the physical server may reserve one or more processors to run other tasks and execute other software apart from the virtual machines. For example, the physical server may assign one or more processors to run the server's operating system, the server's processes, or other administrative and maintenance processes that help the physical server operate.

The virtual machines can also be scaled to be more or less powerful, depending upon a customer's needs for the virtual machine. If it is desired that the virtual machine scale up and become more powerful, the physical server can assign additional processors (and/or additional other computing resources) to the virtual machine. If it is desired that the virtual machine scale down and become less powerful, the physical server can re-assign processors and other resources from the virtual machine.

Each physical server may include one or more gateways having an encoder/decoder module (i.e. encoder/decoder 144 and encoder/decoder 108). These encoder/decoder modules may encode network traffic generated by the virtual machines, and/or decode network traffic received by the virtual machines.

Referring now to FIG. 4, a first virtual machine, VM1, having one or more network interface cards (NiC) (with only one network interface card NiC1 being shown in FIG. 4) and one or more corresponding media access control (MAC) addresses with one MAC address MAGI being shown in the exemplary embodiment of FIG. 4. Each separate NiC has at least one MAC address.

When the first virtual machine transmits a packet to a second virtual machine 146, encoder/decoder 108 operates as an encoder and encoder/decoder 144 operates as a decoder. The opposite is, of course, true when VM 146 transmits a packet to VM 100.

Each MAC address is unique and centrally provisioned (i.e. uniquely assigned from a database). Thus, all MAC addresses are unique throughout the entire system.

If VM1 sends a packet to the encoder (IPv6dst), the encoder receives the packet with no special VLAN tagging required (i.e. it receives any ip traffic, ipx traffic, IPv6 traffic) and encodes it.

During the encoding process a IPv6 destination address (IPv6dst), a source address, and a header are added to the packet. The IPv6 addresses are used to route the Ethernet frame around the global network. The system calculates (i.e. derives) the IPv6 destination address by adding a network prefix, which is fixed in a data center (where each data center may have a certain network prefix). The system then attaches the MAC address to the packet.

Thus, the IPv6 address corresponds to the data center and/or the virtual machine's MAC address. The same process is used for the source address (i.e. the MAC address of the sending destination IPv6 of the virtual machine (e.g. IPv6 address of VM2 in FIG. 4 which is where the traffic is going).

This way the system can produce frames and other network traffic guaranteed to arrive at the right physical machine, because that is where IPv6 address is added. Whenever a virtual machine is assigned a certain MAC address the system makes sure that an IPv6 address is also added to the physical host (e.g. the physical server and/or a NIC card in the physical server) that corresponds to the MAC address.

The packet header includes a client id (e.g. a customer identifier) of the VNET ID. The client ID is also recorded in other parts of the system. For example, the client ID is associated with network traffic generated by VMs of the client, included in databases relating to client billing, etc. The VNET ID is a network identifier. Since a particular client can have multiple networks, VNET IDs are used to identify one or more of the client's networks. Both client IDs and VNET IDs are unique identifiers and may be assigned or tracked by a database. Once the client IDs and VNET IDs are included, the packet is sent to the host IPv6 stack and routed to the remote physical host, which then decodes the packet.

The decoder reads the information in the header and checks whether the virtual network id of the sending virtual machine is the same as or matches that of the receiving virtual machine. This way the system makes sure that Ethernet frames from one virtual network only stay in that virtual network. For example, this helps prevent traffic generated by one client's virtual machines from arriving at the virtual machine of another client. This is the system attaches the virtual network id in the header (i.e. the system handles this aspect, rather than the client) and is enforced in the network stack.

If the header matches, then the system strips away the header, examines the IPv6 destination and source, unpacks the Ethernet frame that the virtual machine 1 (VM1) has created, and feeds the Ethernet frame to virtual machine two (VM2), which then simply sees an Ethernet frame arriving. Thus, one clients' virtual machines sends and receives Ethernet traffic only from other virtual machines in the client's virtual network.

Each physical server may also implement one or more firewalls, such as firewalls 110 and 142. In an embodiment, these firewalls may be software-based firewalls that are executed by the core of a virtual machine. Accordingly, there may be a firewall for each virtual machine. This may allow the firewall to scale as the virtual machine scales. For example, if additional processors are allocated to the virtual machine to make the virtual machine run faster or more powerfully, the firewall may also run faster and more powerfully because it is executed by the core of the virtual machine. This means that the firewall can operate at top speed, or "line" speed because as the virtual machine becomes more powerful and requires more network traffic, the virtual machine also becomes more powerful and can handle the additional network traffic. Also, if a virtual machine is transferred or moved from one physical server to another, the firewall can also move with the virtual machine.

Many traditional networks require a cascaded firewall scheme. In an embodiment, each firewall implemented by a physical server can include a set of rules that is a superset of multiple firewalls. In other words, since there may be one firewall for each virtual machine, each firewall can include a super-set of rules and filters so that a hierarchy of firewalls is not necessary.

Since the firewall is implemented in software and executed by the core of a virtual machine, the firewall can also be configured to have custom traffic filters. For example, network packets in a virtual network between two virtual machines may include custom headers. These headers may include additional information that is not usually found in traditional network traffic. For example, the header may include an identifier of the recipient virtual machine, an identifier of the sender virtual machine, an identifier of a client who owns the virtual machine, an identifier of a recipient or source network of the packet, and identifier of a virtual network, etc. These custom filters can allow or reject traffic based on any combination of information in the custom header. For example, a firewall rule can be set up to check the header of network traffic, compare it to some or all of the custom header information, and reject any traffic coming from a particular virtual machine, except for traffic coming from port 22 of the virtual machine, for example. These custom rules can also help to prevent spoofed or fake packets from getting through to a virtual machine by providing additional methods of data validation, and by providing filters that are not dependent upon traditional network traffic identifiers such as IP address or MAC address.

Figure 5:
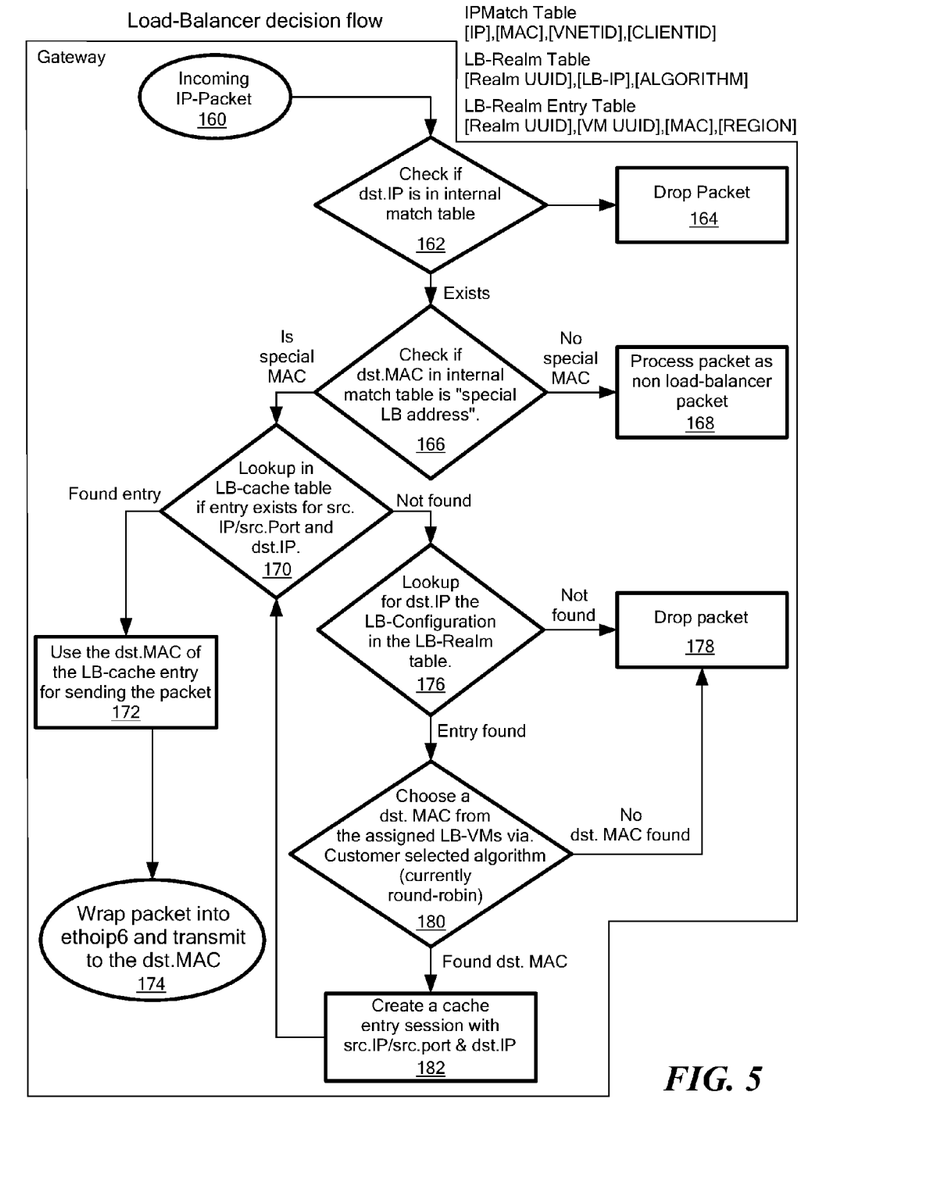
FIG. 5 is flow diagram which illustrates an exemplary load balancer operating process.

Referring now to FIG. 5, load balancer decision flow at a gateway begins in block 160 where an incoming IP Packet is received. Next a decision is made as to whether the destination IP address exists in an internal match table. If the address is not in the match table then the packet is dropped as shown in processing block 164. Otherwise processing proceeds to decision block 166 where a decision is made if the destination MAC address exists in an internal match table. If it does not exist then processing proceeds to block 168 where the packet is processed as a non-load balanced packet. Otherwise processing proceeds to decision block 170 where a determination is made as to whether the entry exists for a search IP address and port and a destination IP address. If no match exists then processing proceeds to block 172 and the destination MAC address is used for sending the packet. Processing then proceeds to block 174 where the packet is wrapped into ethoip6 and transmitted to the destination MAC.

If in decision block 170 the entry is not found then processing flows to decision block 176 where a lookup is made for the destination IP LB-configuration in the LB realm table. If the entry is not found then the packet is dropped as shown in processing block 178. If the entry is found, then processing proceeds to decision block 180 where a destination MAC is chosen. If no destination MAC is found, then the packet is dropped as shown in processing block 178. If the destination MAC is found then processing flow to processing block 182 where a cache entry session is created. Processing then flows back to decision block 170.

Figure 6:
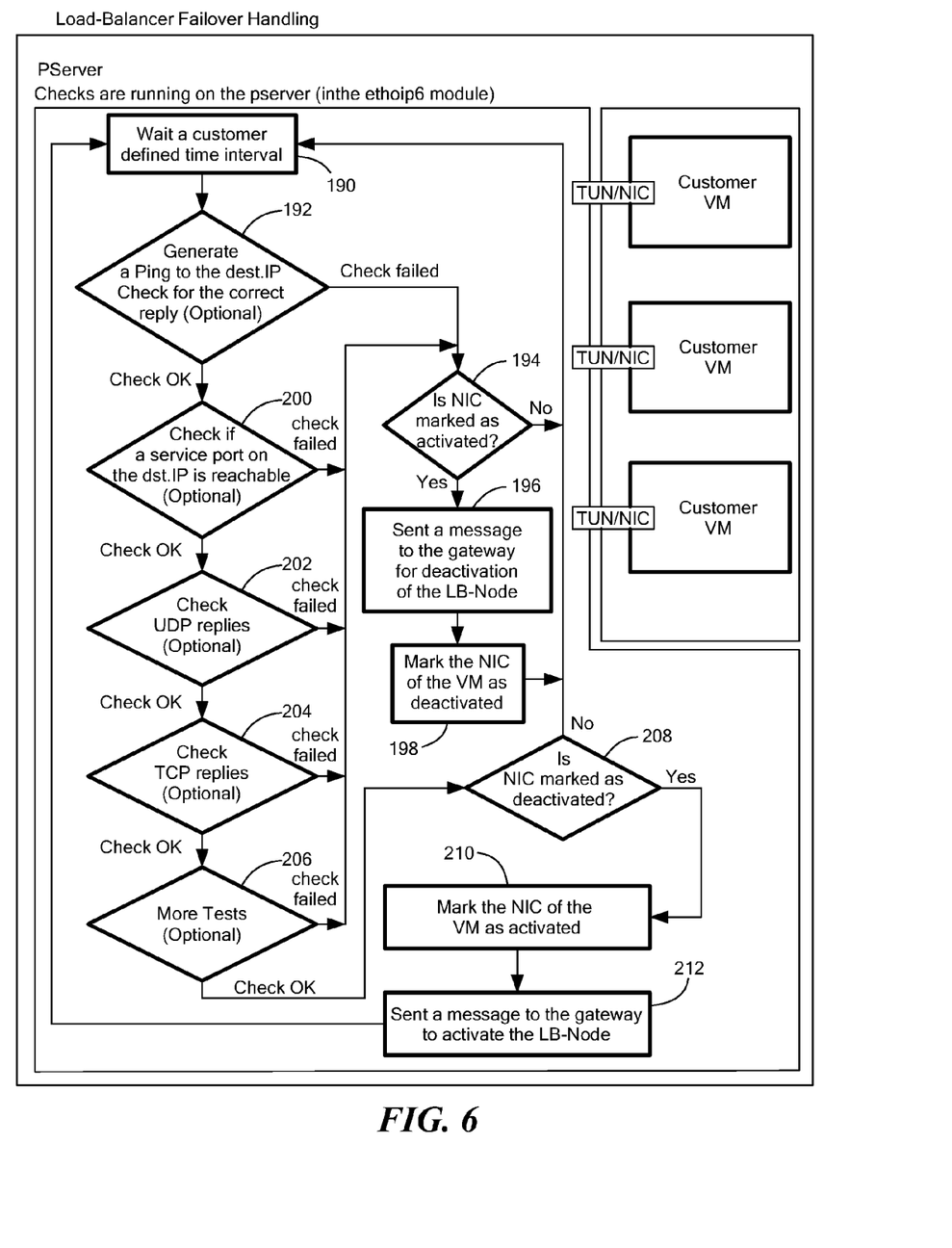
FIG. 6 is flow diagram which illustrates an exemplary process of load balancer failover handling.

Referring now to FIG. 6, a process for load balancer failover handling is shown. In processing block 190, a customer defined wait period is observed. Processing then flows to decision block 192, where a ping is sent to a desired destination. If a correct reply is not received then processing flows to decision block 194 where a decision is made as to whether the NiC should be marked as inactive. If the NiC should not be marked as inactive, then processing returns to processing block 190. If a decision is made that the NiC should be marked as inactive, then processing flows to processing block 196 and a message is sent to the appropriate gateway for deactivation of the LB node. Processing then proceeds to block 198 where the NIC of the virtual machine is marked as deactivated. Processing then returns to processing block 190. It should be noted that the processing in decision blocks 200-206 is optional.

If in decision block 192 the check is okay, then processing flows to decision block 200 where a check is made to determine if a service port on the destination IP is reachable. If the check fails, then processing flows to decision block 194.

If the check is okay, then processing proceeds to decision block 202 where a UDP is checked. If the UDP check fails then processing flows to decision block 194. If the UDP check succeeds, then processing flows to decision block 204 where a TCP reply is checked. If the TCP reply fails then processing flows to block 194. If the TCP reply is okay then processing flows to decision block 206 where more tests may be performed. If the any of the tests fail, then processing flows to block 194, otherwise, processing flows to decision block 208.

In decision block 208 a decision is made as to whether the NIC should be marked as deactivated. If the NIC should not be marked as deactivated, then processing flows to block 190. If a decision is made that the NIC should be deactivated then processing flows to blocks 210 and 212 where the NIC of the VM is marked as deactivated and a message is sent to the gateway to activate the LB-Node.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

The systems and methods described herein may be implemented hardware, software, or a combination. Software may comprise software instructions stored on one or more computer readable medium which, when executed by one or more processors, cause the processors to perform operations that implement the systems and methods.

The invention claimed is:

1. A system comprising:
a first server device executing a first virtual machine and connected to a physical network;
a second server device executing a second virtual machine and connected to the physical network, wherein the first and second virtual machines are connected to a same virtual network;
a first firewall module that functions as a firewall for the first virtual machine and a second firewall module that functions as a firewall for the second virtual machine, the firewall modules configured to filter network traffic received by the physical servers and addressed to the respective virtual servers;
wherein the first firewall module is executed by a core processor of the first virtual machine and the second firewall module is executed by a core processor of the second virtual machine;
wherein the first and second firewall modules each include a superset of the same firewall rules.

2. The system of claim 1 wherein the firewall modules are configured to filter the network traffic prior to the network traffic being received by the virtual network.

3. The system of claim 1 wherein the firewall modules are configured to filter the network traffic based on custom traffic filters.

4. The system of claim 3 wherein the custom traffic filters include a rule to filter traffic based on a client ID of a client that owns a virtual machine.

5. The system of claim 3 wherein the custom traffic filters include a rule to filter traffic based on which virtual machine generated the traffic filter.

6. The system of claim 3 wherein the custom traffic filters include a rule to filter traffic based on a virtual network identifier.

7. The system of claim 3 wherein the custom traffic filters include a rule to filter traffic based on a virtual machine that is a recipient of the traffic.

8. A method comprising:
executing, by a first server device connected to a physical network, a first virtual machine;
executing, by a second server device connected to the physical network, a second virtual machine, wherein the first and second virtual machines are connected to a same virtual network;
executing a first firewall module to function as a firewall for the first virtual machine and a second firewall module to function as a firewall module for the second virtual machine, the firewall modules configured to filter network traffic received by the physical servers and addressed to the virtual machines;

wherein the first firewall module is executed by a core processor of the first virtual machine and the second firewall module is executed by a core processor of the second virtual machine wherein the first and second firewall modules each include a superset of the same firewall rules.

9. The method of claim 8 wherein the firewall modules are configured to filter the network traffic prior to the network traffic being received by the virtual network.

10. The method of claim 8 wherein the firewall modules are configured to filter the network traffic based on custom traffic filters.

11. The method of claim 10 wherein the custom traffic filters include a rule to filter traffic based on a client ID of a client that owns a virtual machine.

12. The method of claim 10 wherein the custom traffic filters include a rule to filter traffic based on which virtual machine generated the traffic filter.

13. The method of claim 10 wherein the custom traffic filters include a rule to filter traffic based on a virtual network identifier.

14. The method of claim 10 wherein the custom traffic filters include a rule to filter traffic based on a virtual machine that is a recipient of the traffic.

15. A system comprising:
a physical server connected to a physical network and executing a virtual machine connected to a virtual network;
a firewall module executed by the virtual machine and configured to function as a firewall for the first virtual machine and to filter network traffic received by the physical server and addressed to the virtual server;
wherein the firewall module includes a superset of firewall rules shared by other firewalls operating on the physical and/or virtual network.

* * * * *